United States Patent Office 3,164,569
Patented Jan. 5, 1965

3,164,569
LINEAR POLYESTERS OF A GLYCOL CONTAINING A p-DIOXANE RING
Kozo Ide, Amagasaki, Japan, and Kentaro Noguchi, Hamburg, Germany, assignors to Kanegafuchi Spinning Co., Ltd., Tokyo, Japan
No Drawing. Filed Sept. 18, 1961, Ser. No. 138,560
Claims priority, application Japan, Sept. 27, 1960, 35/39,932
1 Claim. (Cl. 260—75)

This invention relates to novel linear polyesters and the production thereof.

It is known to prepare polyesters by causing dibasic carboxylic acid such as terephthalic acid or its ester-forming derivatives such as lower alkyl esters to react with glycols. The most typical and valuable representative of the series of polyesters is polyethylene terephthalate which is obtained by the polycondensation of dimethyl terephthalate and ethylene glycol.

While polyethylene terephthalate can be transformed into fibres, films and other shaped articles with various valuable properties, it has some drawbacks particularly in poor dyeability. Further, the fibres of polyethylene terephthalate have tendency to cause undesirable "pilling."

We have now found that linear polyesters are improved in their properties by introducing ether linkages in the polymer chain. It has further been found that the introduction of ether linkages can be effected by wholly or partly replacing glycol (as employed in the conventional method for producing linear polyesters) with a bis-hydroxyalkyl derivative of p-dioxane or its alkyl or aryl substituted compound. By employing the p-dioxane compound there are introduced into the polyester chain dioxane rings with ether linkages.

Thus, the present invention is to provide novel linear polyester in which polymer chain are contained para-dioxane rings with ether linkages. This invention also provides a process for the production of the novel linear polyesters by polycondensation of at least one dibasic carboxylic acid or its lower alkyl ester and at least one glycol, characterized in that at least one glycol to be polycondensed with the dibasic acid or its lower alkyl ester is essentially a bis-hydroxyalkyl derivative of p-dioxane or its alkyl or aryl substituted compound.

In carrying out the present invention, any dibasic carboxylic acid or its lower alkyl esters which has conventionally been employed in the production of linear polyesters may be used. Examples of dibasic carboxylic acids are aromatic dicarboxylic acids such as terephthalic acid, isophthalic acid, phthalic acid, etc.; aliphatic dicarboxylic acids such as oxalic acid, succinic acid, adipic acid, azelaic acid, sebatic acid, etc.; alicyclic dicarboxylic acids such as hexahydro terephthalic acid, hexahydro isophthalic acid, hexahydro phthalic acid, etc.; heterocyclic dicarboxylic acids such as 1,4-dioxane-2,5-dicarboxylic acid, tetrahydrofurane - 2,5 - dicarboxylic acid, pyridine-2,5-dicarboxylic acid, etc.; and other dibasic carboxylic acid such as carbonic acid, etc. These acids may be employed also as lower alkyl esters, said alkyl group containing from one to six carbon atoms. Usually one dibasic carboxylic acid or its lower alkyl ester is employed, but the present invention includes the use of a mixture of two or more of the dibasic carboxylic acids or their lower alkyl esters mentioned above. However, in preparing polyesters suitable for the formation of fibres, films and the like, it is preferable to employ terephthalic acid or its ethyl or methyl ester, or isophthalic acid or its ethyl or methyl ester.

The feature of this invention is in the fact that glycol with which the dibasic carboxylic acid(s) and/or lower alkyl ester(s) thereof are to be polycondensed must consist of or contain at least one bis-hydroxyalkyl derivative of para-dioxane or its alkyl or aryl substituted compound.

Examples of bis-hydroxyalkyl derivatives of para-dioxanes are para - dioxanes are para - dioxane - 2,5-dimethanol, para-dioxane-2,5-diethanol, para - dioxane-2,6-dimethanol, para-dioxane-2,6-diethanol, etc. The para-dioxane ring may be alkyl- (e.g. methyl or ethyl) substituted or aryl- (e.g. phenyl, benzyl) substituted. A mixture of any two or more of these bis-hydroxyalkyl derivatives of para-dioxanes or their alkyl or aryl substituted compounds may be used.

Together with at least one of the above mentioned bis-hydroxyalkyl derivatives of para-dioxane substituted or not substituted with alkyl or aryl group(s), one or more glycols which have conventionally been employed in the production of known linear polyesters can be used. Examples of such glycols are aromatic glycols such as $\alpha,\alpha'$-xylylene glycol, etc.; aliphatic glycols such as ethylene glycol, propylene glycol, pentamethylene glycol, polyethylene glycol, polypropylene glycol, etc.; heterocyclic glycols such as tetrahydrofurane-2,5-dimethanol, tetrahydrofurane-2,5-diethanol, etc.; alicyclic glycols such as 1,4 - cyclohexane dimethanol, 1,3 - cyclohexane dimethanol, etc.

Thus it will be understood that the present invention provides not only polycondensation products but also copolycondensation products from (1) dibasic carboxylic acid(s) and/or their lower alkyl esters, and (2) bis-hydroxyalkyl derivative(s) of para-dioxane substituted or not substituted with alkyl or aryl group(s) and, if desired, (3) glycol(s) which have conventionally been employed in the production or known polyesters, and that the reagents (1) and (2) are essential. This means that the feature of the present invention is in the use of bis-hydroxyalkyl derivative of substituted or non-substituted para-dioxane as the glycol or as a part of the glycol which has conventionally been used in the art of the production of known linear polyesters.

The polycondensation may be carried out by heating the reactants according to known methods which generally comprise (1) melting and mixing the reactants accompanying the ester exchange reaction releasing alcohol or water and then (2) subjecting the precondensation product to the final polycondensation at a high temperature under vacuum. Usually, an excess of the glycol is employed. Thus, for example, a mixture of 1 mol of the dibasic acid or its lower alkyl ester, 1–2 mols of the glycol and a small amount of catalyst is heated to the melting point (usually, between about 190 and 260° C.) for about 10–60 minutes while stirring. During this stage the ester exchange reaction takes place and released alcohol or water is distilled off. Then, the temperature is increased up to about 260–330° C. under reduced pressure, e.g. 5 mm. Hg or less. The increased temperature is maintained (usually, for 1 to 6 hours) until the desired polymer is obtained. Preferably, an inert gas such as nitrogen or carbon dioxide gas is introduced into the reaction system. The catalyst may be any known one, and examples of the same are metals such as metallic sodium, metallic potassium; metal oxides such as lead oxide, antimony oxide; organic salts of metals such as lead acetate, zinc acetate; metal alcoholates such as magnesium methylate, titanium tetrabutoxide, $NaHTi(OC_4H_9)_6$, etc. and their derivatives.

As mentioned before, the feature of the present invention resides in the use of a bis-hydroxyalkyl derivative of p-dioxane substituted with or without an alkyl or aryl group as the glycol to be polycondensed with the acid component. The glycol may consist wholly of the said bis-hydroxyalkyl derivative of p-dioxane or consist partly of the bis-hydroxyalkyl derivative of p-dioxane and partly of other conventional glycol(s) as mentioned before. In case of the latter, the amount of the bis-hydroxyalkyl derivative of p-dioxane should be at least 5 mol percent based upon the whole glycol component in the polymer.

The polyesters obtained according to this invention have, in addition to general or common properties of the conventional polyesters, valuable properties due to the introduction of dioxane rings with ether linkages in the polymer chain. The most useful property of the polyesters of this invention is an improved dyeability of fibres, films and other shaped articles made from the polyesters.

The method for forming polyesters into fibres, films and other articles is well known in the art and no detailed explanation will be required. Briefly, the polyesters of this invention can be cast from an organic solution thereof or extruded from the melt into shaped articles such as fibres and films.

It will be noted from the above that preferable polyesters according to this invention are those suitable for the formation of fibres, films and the like shaped articles. To produce these preferable linear polyesters according to this invention, those materials which have conventionally been employed for the production of known fibre or film forming linear polyesters may be used except that at least a part of the glycol should be para-dioxane-2,5- (or 2,6-) dimethanol (or diethanol). Thus, the acid component to be polycondensed with the glycol component is terephthalic acid or its lower alkyl ester. If desired a small amount (for example, less than about 20%) of other acid such as isophthalic acid, succinic acid or lower alkyl ester thereof may be used together with terephthalic acid or its lower alkyl (methyl or ethyl) ester. When a mixture of glycols is used, at least one component should be para-dioxane-2,5- (or 2,6-) dimethanol (or diethanol) and other glycol components may be ethyleneglycol, polyethylene glycol, cyclohexane dimethanol, etc. which have conventionally been used in the production of known linear polyesters suitable for the formation of fibres and films. In any case, the amount of para-dioxane-2,5- (or 2,6-) dimethanol (or diethanol) should be sufficient so that there is contained in the polymer at least 5 mol percent of para-dioxane containing unit. Thus, preferable polyesters of this invention are those containing at least 5 mol percent of either one or both of the following units:

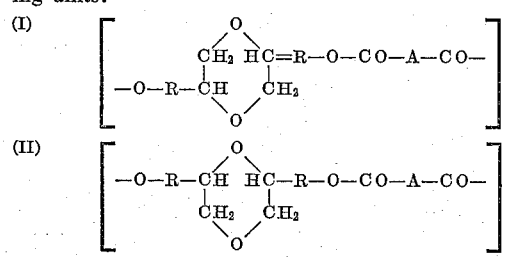

in which R represents methylene or ethylene group and A represents a dibasic carboxylic acid residue.

Further, the preferred polyesters are higher than 200° C. in the melting point and their viscosity [η] is more than 0.3 when measured in a mixture of 60% phenol and 40% tetrachlorethane at 30° C., as intrinsic viscosity.

From these preferable polyesters of this invention various shaped articles such as fibres and films can be fabricated or formed by applying fabrication or spinning techniques well known in the art such as melt spinning, casting from an organic solution, pressing, molding, etc.

Although fibre or film forming polyesters are preferred products of this invention, other polyesters can be produced according to this invention as shown in the later given Examples 2, 3 and 4.

The following examples illustrate the invention without limiting, however, the scope thereof. In any case the intrinsic viscosity of the polymer was measured in a solution in a mixture of phenol and tetrachlorethane (60:40) at 30° C.

*Example 1*

29.1 g. (0.15 mol) of dimethyl terephthalate, 29.6 g. (0.2 mol) of para-dioxane-2,5-dimethanol and 0.03 g. of lead oxide (catalyst) were heated together for 20 minutes at a temperature between 190 and 200° C. while bubbling a slow stream of nitrogen through the reaction mass and distilling off released methanol. Then the temperature was increased to 270° C. under vacuum and further up to a temperature between 310 and 320° C. and the reaction mass was maintained at the increased temperature for about one and a half hours under a reduced pressure of 1–3 mm. Hg to complete the polycondensation, which may be illustrated by the following reaction formula:

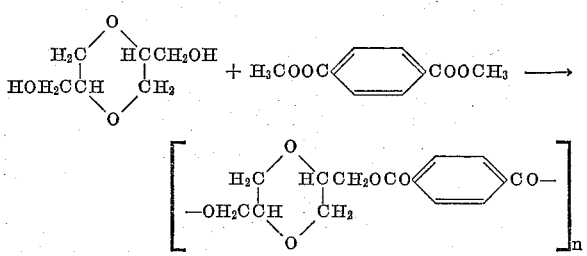

Upon cooling, a white and hard ceramic like polycondensate with a melting point of 295–305° C. (about 35–40° C. higher than that of conventional polyethylene terephthalate) was obtained. The polymer showed an intrinsic viscosity of 0.42 and had excellent fibre forming property. The polymer was transformed by extrusion from the melt into fibres, which were stretched four times their original length at 85° C. The fibres (A) were compared with similarly prepared polyethylene terephthalate fibres (B) in mechanical properties and dyeability. The result was as follows:

|     | Mechanical Properties | | Dyeability* dye (mg.)/ fibre (g.) |
| --- | --- | --- | --- |
|     | Strength (g./d.) | Elongation (percent) |     |
| (A) | 2.8 | 31 | 18.3 |
| (B) | 4.5 | 48 | 12.1 |

* The dyeability was measured as follows: The fibres were immersed for 60 minutes at 120° C. into a bath containing an aqueous dispersion of a dye (2% based upon the amount of the fibres). The ratio of the amount of the fibres and the bath was 1:50. After the dyeing, the liquid remaining in the bath was added with acetone to dissolve the dye and the amount of the dye remaining in the bath was measured by a spectrophotometer to determine the amount (mg.) of the dye taken up by each gram of the fibres. In this Example 1, the dye employed was Eastman Polyester Yellow RL (Eastman Kodak Co.).

*Example 2*

69.5 g. (0.25 mol) of dibutyl isophthalate, 74.0 g. (0.50 mol) of para-dioxane-2,5-dimethanol, 0.02 g. of antimony oxide (catalyst) and 0.05 g. of zinc acetate (catalyst) were heated together for 15 minutes at a temperature between 190 and 200° C. while bubbling a slow stream of nitrogen through the reaction mass. Then the temperature was raised to 280° C. and the polycondensation was proceeded for one hour at the raised temperature and under a reduced pressure below 1 mm. Hg. The condensation product obtained upon cooling was light yellow transparent and its melting point was 70–80° C.

*Example 3*

20 g. (0.2 mol) of succinic anhydride, 70.4 g. (0.4 mol) of para-dioxane-2,5-diethanol and 0.02 g. of metallic sodium (catalyst) were heated together to proceed polycondensation in the manner as described in Example 2. There was obtained a polycondensate in the form of viscous syrup which, upon being left to stand, solidified.

Example 4

223.6 g. (0.2 mol) of diethyl carbonate, 70.4 g. (0.4 mol) of 3,6-dimethyl-para-dioxane-2,5-dimethanol and 0.03 g. of zinc acetate (catalyst) were refluxed for 20 minutes, and then the reaction mass was heated at a temperature between 190 and 200° C. until the released ethanol was distilled off. Thereafter, the temperature was increased up to 280° C. and the increased temperature was maintained for one hour under a reduced pressure below 3 mm. Hg. Upon cooling, a light yellow transparent condensation product was obtained with a melting point of 80–160° C.

Example 5

38.8 g. (0.2 mol) of dimethyl terephthalate, 4.0 g. (0.04 mol) of succinic anhydride, 44.4 g. (0.3 mol) of para-dioxane-2,5-dimethanol and 0.04 g. of titanium tetrabutoxide (catalyst) were heated together for 20 minutes at a temperature between 190 and 200° C. while bubbling a slow stream of nitrogen through the reaction mass and distilling off the released methanol. Then the temperature was increased to 270° C. under vacuum and further up to a temperature between 290 and 300° C. The reaction mass was maintained at the increased temperature for about one hour under a reduced pressure of 1–3 mm. Hg to complete the polycondensation.

Upon cooling, a white, hard, ceramic like condensation product with a melting point of 281–288° C. was obtained. The polymer was 0.40 in the intrinsic viscosity and showed excellent fibre forming property. The polymer was transformed by extrusion from the melt into fibres, which were stretched 3.3 times their original length at 80° C. and further stretched 1.3 times at 160° C. The fibres (A) thus prepared were compared, in the mechanical properties and dyeability, with polyethylene terephthalate fibres (B) which were prepared in a similar manner. The result was as follows:

|     | Mechanical Properties | | Dyeability* dye (mg.)/ fibre (g.) |
| --- | --- | --- | --- |
|     | Strength (g./d.) | Elongation (percent) | |
| (A) | 2.8 | 30 | 18.0 |
| (B) | 4.9 | 42 | 11.3 |

* The dyeability was determined as in Example 1 except that the dye used was Samaron Pink BRL (Farbwerke Hoechst A.G.).

Example 6

77.6 (0.4 mol) of dimethyl terephthalate, 18.6 g. (0.3 mol) of ethylene glycol, 44.4 g. (0.3 mol) of para-dioxane-2,5-dimethanol and 0.06 g. of magnesium methylate were heated together for 20 minutes at a temperature between 190 and 200° C. while bubbling a slow stream of nitrogen through the reaction mass and distilling off the released methanol. Then the temperature was increased to 280° C. and the reaction mass maintained at the increased temperature for about one hour under a reduced pressure of 1–3 mm. Hg.

Upon cooling, a white, hard, ceramic like condensation product with a melting point of 248–258° C. and an intrinsic viscosity of 0.53 was obtained. This polymer showed excellent fibre forming property. The polymer was transformed by extrusion from the melt into fibres, which were stretched as in Example 5. The mechanical properties of the fibres were 4.1 in strength (g./d.) and 35 in elongation (percent) and the dyeability measured as in Example 1 except using Samaron Pink BRL as the dye was 15.6 (dye mg./fibre g.).

Example 7

38.8 g. (0.2 mol) of dimethyl terephthalate, 21.6 g. (0.15 mol) of trans-1,4-cyclohexane-dimethanol, 22.2 g. (0.15 mol) of para-dioxane-2,5-dimethanol and 0.05 g. of $NaHTi(OC_4H_9)_6$ were heated together to effect the polycondensation in a manner as described in Example 5.

Upon cooling, a white, hard, ceramic like condensation product with a melting point of 276–281° C. and an intrinsic viscosity of 0.45 was obtained. The polymer showed excellent fibre forming property. The polymer was transformed by extrusion from the melt into fibres, which were stretched 3.7 times the original length and heat treated at 160° C. for ten minutes under tension. The fibres (A) thus prepared were compared, in the mechanical properties and dyeability, with fibres (B) polycyclohexylene dimethylene terephthalate which are polycondensate of terephthalic acid and 1,4-cyclohexane-dimethanol (70% trans, 30% cis) and have been prepared in a similar manner. The result was as follows:

|     | Mechanical Properties | | Dyeability* dye (mg.)/ fibre (g.) |
| --- | --- | --- | --- |
|     | Strength (g./d.) | Elongation (percent) | |
| (A) | 2.7 | 28 | 18.4 |
| (B) | 3.0 | 29 | 12.8 |

* The dyeability was determined as in Example 1 except that the dye used was Latyl Blue BCN (E. I. du Pont de Nemours & Co.).

Example 8

38.8 g. (0.2 mol) of dimethyl terephthalate, 39.6 g. (0.275 mol) of 1,4-cyclohexane-dimethanol (trans 70%, cis 30%), 3.7 g. (0.025 mol) of para-dioxane-2,6-dimethanol and 0.04 g. of lithium aluminium hydride (catalyst) were heated together to effect the polycondensation in a manner similar to Example 5.

Upon cooling, a white, hard, ceramic like condensation product with a melting point of 275–285° C. and an intrinsic viscosity of 0.48 was obtained. This polymer showed excellent fibre forming property. The polymer was transformed by extrusion from the melt into fibres, which were stretched and heat treated as in Example 7. The mechanical properties of the fibres were 3.0 in strength (g./d.) and 30 in elongation (percent) and the dyeability measured as in Example 1 except using Latyl Blue BCN as the dye was 14.5 (dye mg./fibre g.).

What we claim is:

A fiber-forming linear polyester which is the polycondensation product of the reactants consisting essentially of (a) an acid selected from the group consisting of terephthalic acid, terephthalic acid lower alkyl ester, isophthalic acid, isophthalic acid lower alkyl ester, and mixtures thereof, and (b) a glycol, 5–100 mole percent of said glycol being selected from the group consisting of para-dioxane-2,6-dimethanol, para-dioxane-2,6-diethanol, para-dioxane-2,5-dimethanol, para-dioxane-2,5-diethanol and mixtures thereof, and the remainder of said glycol being selected from the group consisting of ethylene glycol, cyclohexane dimethanol, and mixtures thereof.

References Cited by the Examiner

UNITED STATES PATENTS 3,015,665  1/62  Wollner _____ 260—75

OTHER REFERENCES

Reppe et al.: Chem. Abs., vol. 50 (1956), page 16775h.

WILLIAM H. SHORT, *Primary Examiner.*

LOUISE P. QUAST, *Examiner.*